Sept. 24, 1968   P. J. ZERWES   3,402,846
ARTICULATED COVER AND FACE PLATE UNIT
Filed June 1, 1967   2 Sheets-Sheet 1
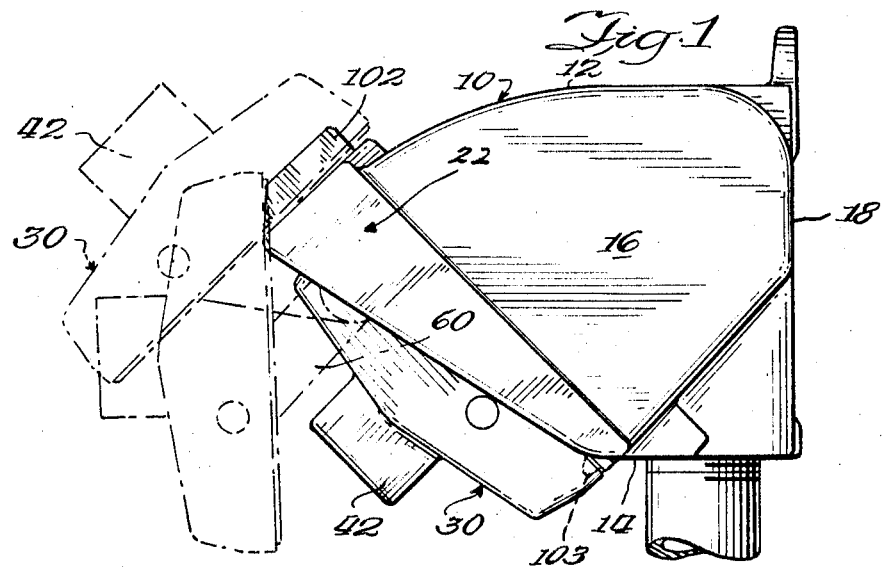
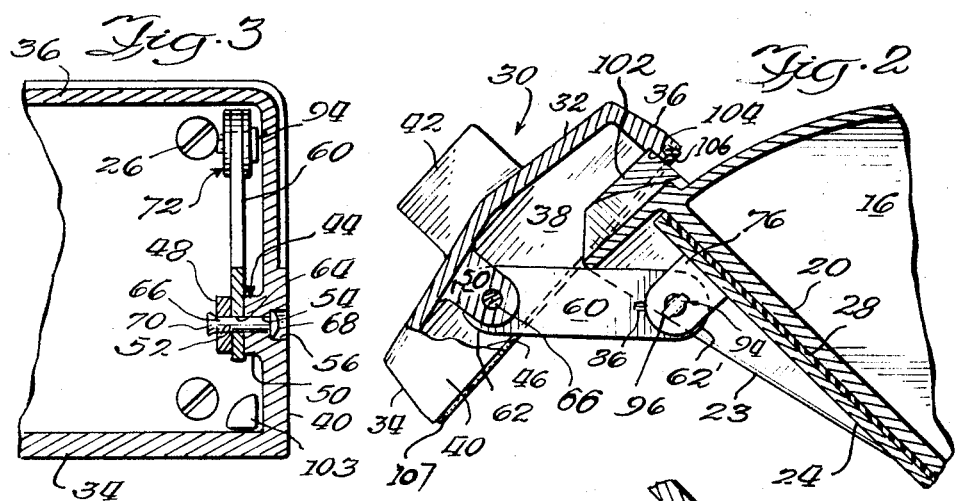
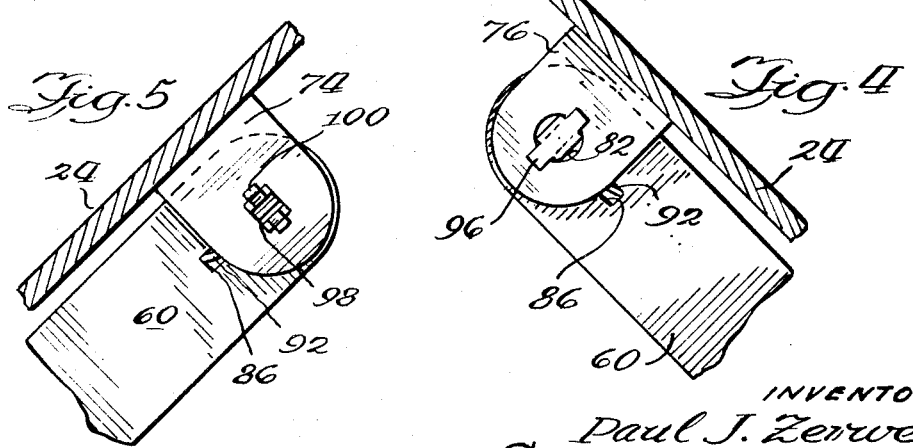
INVENTOR
Paul J. Zerwes
BY Silverman & Cass
ATTORNEYS

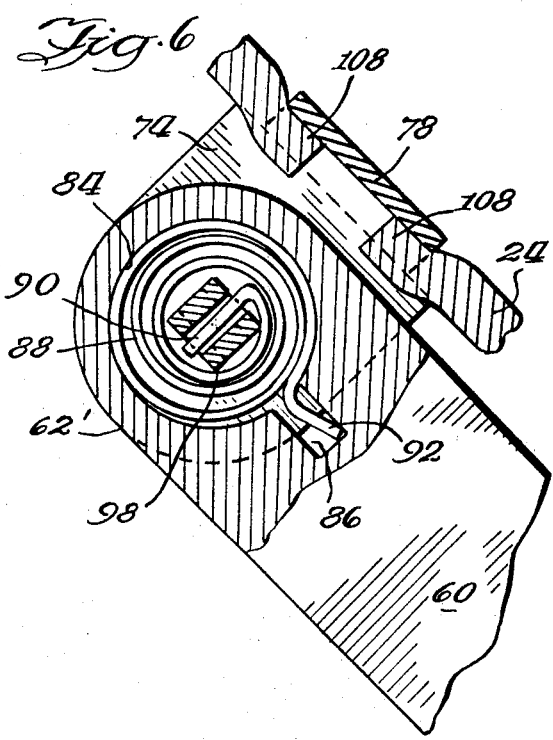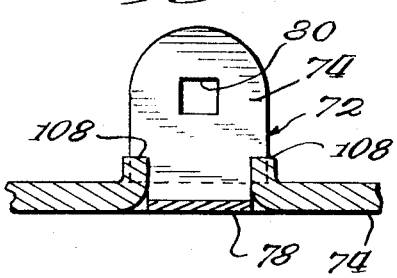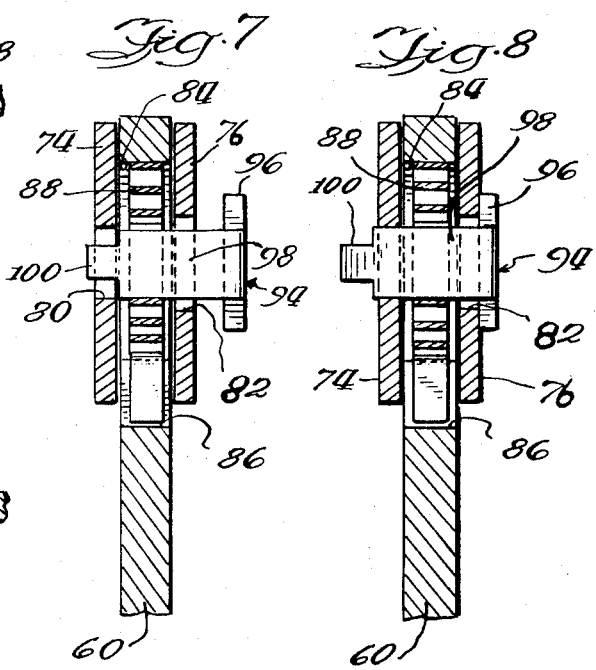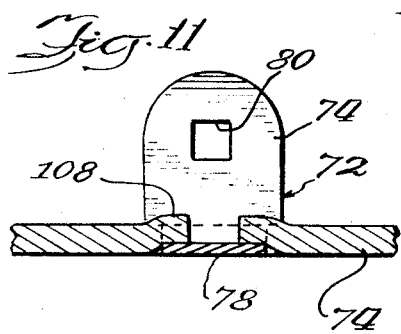

3,402,846
Patented Sept. 24, 1968

3,402,846
ARTICULATED COVER AND
FACE PLATE UNIT
Paul J. Zerwes, Chicago, Ill., assignor to Bell Electric Co.,
Chicago, Ill., a corporation of Illinois
Filed June 1, 1967, Ser. No. 642,872
19 Claims. (Cl. 220—3.8)

ABSTRACT OF THE DISCLOSURE

A rain tight articulated cover and face plate unit for an electrical junction box, the cover formed as a hollow body member having top and peripheral walls, the peripheral walls having coplanar free edges defining a cavity opening to a planar face plate and sealingly engageable therewith adjacent the perimetric edges thereof, the cover being mounted to the face plate by means of pivot connections at opposed ends thereof and said connections each comprising a planar link arranged journalled to a bracket formed interior of the cover and to a bracket mounted to the face plate, each planar link having a pocket formed therein at one end thereof to accommodate a spiral spring, said pocket being in the form of a passageway through the link and being enclosed by the last mentioned bracket; the bracket consisting of a pair of upstanding spaced tabs carrying coaxial passageways of differing cross-sectional configuration and the link being journalled on a bifurcated shaft member engaged through said link and the coaxial passageways, the arms thereof engaging the spring; the shaft being free to rotate when engaged through one of the passageways and the link but restricted against rotation when engaged further through the other of said passageways, torque on the spiral spring being applied when the shaft is free to rotate and the resulting tension being maintained by driving the shaft further through said other passageway locking same against rotational movement. Detent means also is provided at a location adjacent the face plate for maintaining the cover in open condition against the normal spring bias thereof with a considerable portion thereof overhanging outwardly of said face plate so as to shield the surface thereof. A novel method of mounting bracket means for said pivot connection to said face plate also is described.

---

This invention relates generally to electrical junction boxes and more particularly concerns the provision of an improved rain-tight spring-loaded articulated cover for an electrical junction box particularly of the weatherproof type.

Modern outdoor living trends have created increased demand for weatherproofed electrical junction box installations. In order to provide such installations, one must provide means for shielding the face of the structure from the direct exposure to elements such as rain, snow, dust and the like. One must also provide adequate gasketing to insure against entry of moisture, dust and the like to the interior of the box. Mounting means for securement of electrical appliances to the junction box, such as switches, outlet receptacles, telephone jacks, etc. must be provided with retention of sufficient area for accommodating such appliances and the wiring therefor. Cost considerations likewise are paramount in the design of weatherproofed junction box installations so that ease of fabrication and assembly are important criteria.

In my copending application, Ser. No. 567,461 filed July 25, 1966, and now pending in the U.S. Patent Office, a novel hooded weatherproof electrical junction box construction first was disclosed, characterized principally by the provision of an integral canopy extending forwardly of an inclined planar mounting wall functionig as the face of the electrical juction box. Structures made in accordance with the teachings of said copending application have become widely accepted in the trade, these structures being embodied in at least two distinct forms. One of these forms comprises a hood adapter structure for installation on the face of a pre-existing junction box installation, or on an exterior adapter for a junction box or simply to a base plate mounted to a wall. Said structures also may take the form of an integral cast junction box. All of these structures have, in common, the use of conventional spring-biased hinged snap covers suitably fastened on the planar wall or on a cover or face plate for said wall and arranged to cover the access opening provided for the electrical appliance, say an outlet receptacle. The conventional snap cover structure normally pivotally is connected to a bracket fastened to the planar wall on to the cover plate and carries a gasket for sealing the receptacle or similar appliance from the exterior of the planar wall with the snap cover in place thereover. The snap cover can be pivoted and maintained in either fully open or fully closed condition by provision of conventional spring means.

Certain physical disadvantages are inherent in the conventional snap-cover structure. First, the snap cover structure occupies a substantial amount of space on the cover plate or planar wall of the junction box. Second, there is no opportunity to adjust or to exert control over the tension placed on the spring means other than in choice of the spring used. Therefore, the seal affected by the snap cover may not always be uniform. Also, the hinge and the spring are exposed, particularly in the open condition. Notwithstanding the hood provided, opening of the snap cover to make the connection also results in exposure of the receptacle to both side and overhead attack by adverse weather elements. Further, the conventional snap covers are not self-locating and may leave accessible areas leading to the receptacle. Another disadvantage found in the use of conventional snap covers is interference with access to the receptacles, since the covers must be fully opened within the canopy area.

Accordingly, it is a principal object of this invention to provide an improved articulated snap cover for an electrical junction box which is superior to conventional snap cover constructions and eliminates the disadvantages thereof enumerated above.

Another object of this invention is to provide a spring-loaded articulated snap cover for an electrical junction box, which cover is adapted to cover and protect the total area of the face of the junction box and is supported on opposite sides thereof by a pair of planar links, each being pivotally secured both to the cover and to the face of the junction box and each carrying a spiral tension spring substantially fully enclosed within a cavity formed in the link.

Another object of the invention is to provide, in a spring loaded articulated snap-cover arrangement for an electrical junction box, means whereby a predetermined torque can be applied to the spring thereof and thereafter a uniform tension maintained.

Another object of this invention is to provide a spring-loaded articulated snap cover and a cover plate unit for an electrical junction box, said unit capable of use with conventional electrical junction boxes, the cover plate being provided with novel mounting means for said cover.

Another object of the invention is to provide articulated cover and face plate unit for an electrical junction box having a greater than conventional amount of usable space on the plate to increase its versatility.

A further object of this invention is to provide for an electrical junction box, a spring-loaded articulated hinged cover which is self locating self-aligning.

A still further object of this invention is to provide a spring-loaded, articulated snap cover and face plate unit wherein the spring is seated substantially entirely enclosed within a passage formed in one end of a planar link, said one end being mounted upon a shaft arranged journalled in a pair of aligned passageways formed in an upstanding bracket secured to said cover plate, said passageways being of non-conforming configurations whereby the shaft is rotatable only when passed through one of the passageways and is immobilized against rotation by entry thereof into the other of said passageways.

A further object of this invention is to provide a spring loaded articulated cover of the character described wherein the cover is mounted to a cover plate by means of a bifurcated shaft member which functions as a key for application of a predetermined torque to a spiral spring enclosed in the link.

Yet another object of this invention is the provision of a novel bracket for mounting the supporting links of the cover pivotally to the cover plate, and to a novel method of fabricating said bracket which results in substantial saving in material and labor in the course of fabrication.

Yet a further object of the invention is to provide, in the structure of the character described, means for retaining the spring-loaded articulated cover in an open condition with a substantial portion thereof extending forwardly of the hooded portion of the junction box construction thereby to serve as a supplementary shield for the face of the box.

A further object of the invention is to provide channel means on the cover for retaining a peripheral gasket extending outwardly thereof thereby eliminating the massive gasket structures heretofore utilized.

Other objects and advantages of this invention will become evident to one skilled in this art from a detailed description hereinafter of a preferred embodiment thereof with particular reference to the accompanying drawing.

In the drawings:

FIG. 1 is a side elevational view of a hooded weatherproof electrical junction box having the spring-loaded cover of the invention operably installed thereupon, portions being illustrated in phantom lines to indicate stages in the operation of said cover.

FIG. 2 is a fragmentary side elevational view of the hooded junction box and cover assembly, portions of which are shown in section.

FIG. 3 is a fragmentary section taken through the cover of FIG. 1.

FIG. 4 is an enlarged fragmentary detail of the mounted spring-containing link of FIG. 3 as viewed from the right side thereof.

FIG. 5 is a view similar to FIG. 4 but taken from the opposite direction.

FIG. 6 is an enlarged fragmentary detail of the mounting arrangement of the spring-containing link, portions being illustrated in section to show interior detail.

FIG. 7 is a fragmentary detail as viewed from above and with portions in section illustrating the first stage in mounting of the link to its bracket on the cover plate ready for the application of a predetermined torque to the spring housed within the link.

FIG. 8 is a view similar to that of FIG. 7 but illustrating the same link and bracket subsequent to application of a desired torque to the spring and fixing of the link supporting shaft permanently on the bracket.

FIGS. 9, 10 and 11 show various stages assumed in the assembly of the bracket to the cover plate or face plate of the junction box, in accordance with the method of the invention.

Referring now to the drawing, in FIGS. 1 and 2 there is shown a hooded weatherproof junction box assembly 10 having top and bottom wall 12 and 14, side walls 16, a rear wall 18 and a planar front wall 20. The front wall 20 is inclined to about a 45° angle relative vertical, and is recessed from the forward edges of said top and side walls. A canopy structure 22 is defined as extensions of top wall 12 and side walls 16 with the forward edges 23 of the congruent side walls 16 being inclined at an angle greater than the angle of inclination of the front wall.

The front wall 20 is provided with suitable standard size threaded openings (not shown) which serve to enable the attachment of an electrical appliance, such as a plug-in outlet receptacle (not shown) to the wall 20. Of course, a large opening is formed in wall 20 so as to accommodate the body of the electrical receptacle (not shown) within the junction box 10. The front wall 20 may be described as a continuous flange formation arranged in the plane normal to side walls 16. A cover or face plate 24 is adapted to be secured to wall 20 by fastening means such as screws 26 accommodated in certain ones of the threaded openings carried by the front wall 20. Interposed between the cover plate 24 and the front wall 20 is a suitably apertured thin rectangular gasket 28.

Conventionally, a pivotally secured spring-biased snap cover would be provided, suitably fastened on the cover plate 24 at desired locations and properly gasketed to seal the exposed face of the appliance from the exterior of the junction box 10. The invention principally is concerned with substitution, for such a conventional snap cover, of an articulated rain-tight hinged cover for protecting the entire face of the junction box. The said cover is swingably movable outward and upward to rest upon means provided on the top wall of the junction box when access is desired to the receptacle and, otherwise to entirely cover the face of the junction box. The invention also concerns the provision of an enclosed spring arrangement, the spring being capable of being set to a predetermined tension and maintained at such tension for an indefinite period of time. Further the invention is concerned with a novel method of mounting the said improved snap cover to the cover plate.

Referring again to the drawings, the hinged snap cover constructed in accordance with the invention shall be designated generally by reference numeral 30. The cover 30 is a dish-shaped rectangular member having top wall 32, side walls 34 and 36 and end walls 38 and 40, preferably formed as a unitary casting with the outer free edges of walls 34, 36, 38 and 40 coplanar. A handle or knob 42 is provided as a part of the top wall 32 centrally located thereon and extending outwardly thereof.

Bracket formations 44 are formed integral with the top wall 32 and depending interior of the cover 30 at adjacent opposite end walls 38 and 40, with portions thereof also being integral with the respective associated end wall and located closer to the sidewall 34 than to wall 36. Since the formations 44 at the end walls 38 and 40 are identical, only one will be described in greater detail. Said formation 44 comprises a pair of depending tabs 48, 50 which extend toward the open mouth 46 of the cover. Aligned like openings or passageways 52 and 54 are formed in the tabs 48 and 50. Passageway 54 opens into recess 56 formed in the adjacent end wall 40.

A flat link 60 having rounded ends 62 and 62' is received at one end 62 thereof between the tabs 48 and 50. The link 60 carries at said end 62 and spaced slightly therefrom, an opening 64 of conforming configuration to openings 52 and 54. The link 60 is arranged interposed between tabs 48 and 50 so that passageways 52, 64 and 54 are aligned. A pin or hollow rivet 66 is received through said passageways 52, 64 and 54, with the head 68 of pin 66 accommodated within recess 56 and the opposite end 70 spread to prevent withdrawal of the pin. The pin 66 serves as a bearing shaft pivotally to connect the said one end 62 of link 60 to the cover 30.

Other brackets, 72, are secured to cover plate 24 at a location thereon closely adjacent one corner thereof at opposite ends thereof, only one being described in detail as both are identical. The bracket 72 consists of a pair of upstanding tabs or ears 74 and 76 normal to the plate 24 and spaced apart. Tabs 74 and 76 are joined by bridging portion 78. A rectangular passageway 80 is formed in tab 74 and, coaxial therewith, a circular passageway 82 is formed in tab 76. Passageway 82 is formed of diameter slightly greater than the diagonal distance across passage 80. The tabs 74 and 76 are spaced apart a distance about equal to the thickness of link 60 so that the link 60 can be accommodated therebetween, as will be explained hereinafter.

As was described above, one end 62 of link 60 is engaged pivotally to the cover 30. The other and opposite end 62' of link 60 has a large, circular cross-section, through passageway 84 formed therein. A notch 86 also is formed in the link 60 opening to passageway 84. A flat band, spiral spring 88 having an inner end 90 and an outer end 92 forcibly is accommodated entirely within the passageway 84 of link 60 with the portion 92 engaged in notch 86 and the portion 90 disposed substantially centrally in said passageway 84 extending across the passageway and passing through the center thereof. The width of the spring 88 is no greater than the thickness of the link 60. The link with the spring 88 accommodated in passageway 84 thereof as described, then is passed between the tabs 74 and 76 so that passageways 80, 82 and 84 are coaxial.

A bifurcated member 94 having a rectangular head portion 96 and a pair of planar arms 98 is provided to serve as a shaft for supporting pivotally the end 62' of link 60. The arms 98 may terminate in end tabs 100. A cross section taken through said arms is of rectangular configuration. The arms 98 are passed through the circular opening 82 with the portion 90 of spring 88 engaged between said arms 98, as shown in FIG. 7. In this condition the shaft is free to rotate.

A tool (not shown) then may be utilized to wind the spiral spring 88 whereby to apply a specified torque thereto. When a specified torque has been applied to the spring 88, say in 90° increments of turn, the head 96 of the bifurcated member 94 is impressed against tab 76 with the arms 98 engaged entirely through the rectangular passageway 80 of tab 74. Because passageway 80 is of a configuration conforming to the cross-sectional configuration of the pair of arms 98 of member 94, when the arms 98 of member 94 are engaged through passageway 80, the member 94 cannot be rotated and hence the spring 88 is retained at the applied tension by end 90 thereof held between arms 98. Thereafter, the end tabs 100 may be peened over the edge of said passageway 80 onto the surface of tab 74 to make the pivotal connection permanent. If one desired to adjust the tension of the springs to different torque values, this may be done in 90° increments of turn where a rectangular cross-section passageway 80 is utilized. The tension should be adjusted prior to the peening of end tabs 100 completing the assembly. The completed assembly just prior to peening over the end tabs is shown in FIG. 8 while the fully completed assembly is illustrated in FIGS. 3 and 5.

Referring to FIG. 1, the phantom outline of the cover and link arrangement according to the invention illustrates the relative positions assumed by the cover 30 and link 60 during the opening of the cover 30 for gaining access to the receptacle mounted in the junction box.

First, the handle 42 is grasped by the operator to lift the cover 30 from its closed position in a motion outward of the cover plate 24 and upward with the free edges of the end walls 38, 40 thereof substantially parallel to the cover plate 24. During this motion, the links 60 are pivoted at both ends. When the links 60 are disposed substantially normal to the surface of the cover plate 24, the cover 30 is rotated on its pivot connection with the links 60 to assume the intermediate disposition shown in dotted outline in FIG. 1. The cover 30 then is further raised and the links 60 pivoted at their pivot connection with the cover plate 24 so that the cover 30 is raised to a position with the end walls 38 and 40 thereof assuming a position normal to the cover plate 24. Appropriate detent means in the form of an upraised portion 102 is provided on the top wall 12 of the junction box so that the wall 36 of the cover 30 is caught by portion 102 and retained thereby in open disposition.

Obviously the major portion of the cover 30 extends over the edge of the canopy 22 so as to provide greater shielding forward of the canopy 22. Further, attention is directed to the fact that the linkages, and the pivot connections of the linkages both to the cover and to the cover plate are shielded at all times, both, in the open and in the closed condition of the cover 30. If desired a shallow recess 104 may be provided in rear wall 36 of the cover 30 to aid in sliding the cover 30 over the detent 102.

With the restriction of lateral movement of the links 60 on opposite sides of the cover by engagement on the respective brackets, it is obvious that the cover 30 is self-aligning with the cover plate 24. Raised abutments 103 may be provided in the cover plate 24 to aid such alignment.

A channel 104 coextensive with the coplanar edges of wall 34, 36, 38 and 40 may be provided for holding a gasket of substantially rectangular configuration captivated within said channel on three sides so as to provide a good, rain-tight seal.

As described above, the bracket 72 may be attached to cover plate 24 by any number of conventional methods such as spot welding, riveting, upsetting or the like. However, it has been found that the following described method is least expensive and more conducive to the joining of the bracket 72 to the cover plate 24, without the formation of waste, of maintained openings and/or unwanted protuberances. Reference is made to FIGS. 9, 10 and 11. An opening 106 of rectangular configuration (dotted line) is formed first in cover plate 24 at the location desired for mounting of brackets 72. A pair of upset portions 108 are formed framing opposite edges of said opening 106. The distance between the inner edges of portions 108 (designated by arrows 110) is equal to the length of bridging portion 78 of bracket 72. Bridging portion 78 of bracket 72 connects tabs 74 and 76 at a narrow portion 112 thereof and is of a thickness substantially less than the thickness of plate 24. Portion 78 is fitted through the opening defined by upset portions 108 so that the wide portions of tabs 74 and 76 abut the upper surface of plate 24 and portion 78 has a bottom surface 114 coextensive with the bottom surface 116 of plate 24 as shown in FIG. 10. The upset portions 108 are peened over bridging portions 78 as shown in FIG. 11 to provide a secure connection. It should be noted that the thus formed connection is free of leakage paths.

What it is desired to be secured by Letters Patent of the United States is:

1. An articulated cover and face plate unit for a junction box, the face plate adapted to be installed into the opening of the box and having means for providing access to an electrical appliance mounted in the box, the cover member being provided with means for effecting a substantially sealing engagement with the face plate adjacent the perimetric edges thereof, said unit comprising: a dished cover member, a face plate, link means pivotally connected at respective ends of both the cover and the face plate and one of said pivotal connections having a substantially enclosed spring means arranged to bias the cover toward the face plate.

2. The structure as claimed in claim 1 in which means are provided for adjusting the tension on said spring means.

3. The structure as claimed in claim 1 in which said link means comprises link members of planar configuration pivotally connected to the cover and face plate at opposite ends thereof, each link having an enlarged opening formed at one end thereof and a notch opening only to said enlarged passageway, said spring means receivable within said opening with the outer end thereof engaged within said notch and the inner end transverse the opening.

4. The structure as claimed in claim 1 in which a pair of spaced tabs are secured to the face plate, said tabs having opposite coaxial passageways, said link means being arranged between said tabs substantially to enclose the spring means and a bifurcated shaft disposed through said coaxial passageways and the link to form said one pivotal connection, said shaft being engageable with said spring means.

5. The structure as claimed in claim 4 in which one of said coaxial passageways is of size and configuration to permit rotation of the shaft therein, the other of said coaxial passageways having a cross-section of size and configuration to immobilize the shaft when same is engaged therethrough.

6. The structure as claimed in claim 1 and channel means in the free edges of the cover, elongate gasket means seated within said channel and having a portion extending outward therefrom thereby to seal the juncture of said cover and face plate.

7. The structure as claimed in claim 1 in which said spring means comprise a spiral spring.

8. The structure as claimed in claim 7 and keyed shaft means for journalling said link means at said one pivotal connection, said keyed shaft means engaging a portion of said spiral spring and being selectively rotatable for application of a predetermined torque thereto.

9. The structure as claimed in claim 8 in which means are provided at said one pivotal connection to immobilize the keyed shaft means whereby to preserve the spring tension resulting from application of the predetermined torque thereupon.

10. The structure as claimed in claim 8 in which said keyed shaft means comprises a shaft having a head portion and a pair of spaced parallel arms extending codirectionally from said head.

11. The structure as claimed in claim 10 and a bracket secured to the face plate, said bracket having a pair of spaced parallel tabs, the tabs having a pair of coaxial passageways and the link means arranged between said tabs, the keyed shaft means extending through said passageways and link, the inner end of the spring disposed between the arms, one of said coaxial passageways being polygonal in cross-section and having a diagonal dimension substantially equal to the diagonal cross-section of the shaft the other coaxial passageway being slightly larger than the one passageway.

12. The structure as claimed in claim 11 in which said shaft and one passageway are polygonal in cross-section.

13. In an electrical junction box having a front mounting wall permitting access to an electrical appliance carried in the box, an articulated dish-shaped cover having top and peripheral walls, the peripheral walls having coplanar free edges and defining a cavity opening to said front mounting wall, said cover being operable between a closed position with the free edges sealingly engaged on said front mounting wall surface closely adjacent the perimetric edges thereof and an opened position engaged one edge of the junction box, a substantial portion extending forwardly of said mounting wall thereto, first brackets secured on the cover interior and second brackets secured on the mounting wall, a pair of planar link members having opposite ends mounted in the first and said second brackets for pivotal movement, said link members each having a pocket at one end thereof, spiral spring means disposed within said pocket enclosed by said second bracket and means for applying a predetermined torque to said spring means from the exterior thereof for adjusting the spring tension and retaining the spring at the resulting tension.

14. The structure as claimed in claim 13 in which said last mentioned means for applying a torque to the spring and retaining the spring at the resulting tension comprises a bifurcated shaft member, opposite coaxial passageways formed in said second bracket, one having a cross-section greater than the cross-section of the shaft and the other passageway conforming to the cross-section of said shaft, said shaft being stepwise engageable through one passageway to engage a portion of said spring for application of the predetermined torque to the spring by rotation of said shaft and thereafter engageable through the other passageway to immobilize the shaft for maintaining the resulting tension on the spring.

15. The structure as claimed in claim 13 and detent means on the box engageable with the cover in the opened position thereof.

16. The structure as claimed in claim 13 and channel means formed free edges of the peripheral cover wall and a gasket seated therein extending outward therefrom whereby to seal the engagement of said cover with said mounting wall.

17. In combination, an electrical junction box which comprises a body portion having side, top, bottom and front walls to define a housing for receiving an electrical appliance therein, said body having a front face defined by said front wall and including means to permit access to the appliance for making of an electrical connection thereto, the top wall having a sloped forward portion of upwardly convex configuration said front wall being inclined outwardly of the bottom wall and recessed from the surrounding edges of said side and top walls, whereby to define a canopy-like enclosure extending outwardly of the inclined front wall and an articulated spring biased, hollowed lid pivotally mounted to said front wall, detent means adjacent said canopy like enclosure on the top wall of the body for retaining the lid in an open condition with a substantial portion thereof extending outwardly of said top wall and said lid normally biased to a closed condition sealingly engaged on the front wall closely adjacent the perimetric edges thereof, said lid and said front wall having bracket means secured respectively thereon and planar links each having opposite ends secured pivotally to said bracket means, each link having a cavity formed therein at one end thereof and spiral spring means mounted within said cavity enclosed within said associated bracket means.

18. The combination as claimed in claim 17 in which said front wall comprises a planar face plate mounted to an integral front portion of said body, said cover being mounted to said face plate.

19. A method of attaching a mounting bracket, consisting of a pair of upstanding tab members connected at their lower ends by a bridging portion of lesser width than the tab members, to a face plate for an electrical junction box comprising the steps of first, forming an opening in the plate of lesser width than that of said bridging portion; second, forming a pair of opposite upset portions at opposite ends of said opening with the said upset portions spaced at a distance equal to the width of said bridging portion; third, seating said bridging portion between said upset portions with the said portion coplanar with the undersurface of said plate; and, fourth, peening the upset portions over the bridging portions and between the upstanding tab members.

References Cited

UNITED STATES PATENTS 3,140,344  7/1964  Slater et al. _____ 220—3.8
3,188,379  6/1965  Simon _____ 220—3.8

JAMES B. MARBERT, *Primary Examiner.*